Patented July 2, 1929.

1,719,762

UNITED STATES PATENT OFFICE.

HERBERT A. GOLLMAR, OF EAST ORANGE, NEW JERSEY, ASSIGNOR TO THE KOPPERS COMPANY, A CORPORATION OF PENNSYLVANIA.

GAS-PURIFICATION PROCESS.

No Drawing. Application filed November 5, 1926. Serial No. 146,569. Renewed April 10, 1929.

This invention relates to the purification of gas and more particularly to the removal of hydrogen sulphide and analogous impurities from fuel gas, such as coke oven gas, water gas and the like, and other gases containing such impurities.

My invention has an especial relation to processes wherein an absorbent liquid is recirculated through a cyclic system comprising an absorption and an actification stage.

An object of my invention is to provide a process whereby purification of gas may be accomplished economically and conveniently.

A second object of my invention is to provide a liquid capable of absorbing hydrogen sulphide and of being actified or revivified at a more rapid rate than has been possible in the prior art.

A further object of my invention is to provide economical and convenient means for actifying the absorbent solution after contact with the impurity-laden gas.

A further object of my invention is to provide a convenient method of preparing a solution of the character indicated.

A further object of my invention is to reduce the consumption of alkali due to side reactions and the like in a gas purification process.

My invention has, for further objects, such other operative advantages and results as may hereinafter be found to obtain.

In the prior art of gas purification, alkaline solutions containing metallic compounds such as iron oxide, nickel sulphide and the like, have been used in cyclic gas purification processes with the object of fixing sulphur removed from the gas in elemental form in the actification stage. Such prior processes are open to the disadvantage that the metallic compound (either per se or by reason of the presence of liberated sulphur) promotes side reactions, such as the formation of thiosulphate, which result in high rates of consumption of the alkali. Furthermore, the rate of oxidation of the fouled liquid has been found to be a limiting factor in processes of this character and may require the provision of expensive apparatus.

Moreover, the sulphur liberated in the actification stage and as removed by flotation may contain a considerable amount of entrained metallic compound, which contaminates the sulphur and which is lost to the process unless supplementary means are provided for its recovery. There are also numerous obvious disadvantages in handling suspensions rather than solutions. That processes of this character have been successful is due to the great need for gas purification processes which do not require the disposal of noxious gas and to ingenious methods whereby the efficiencies of absorption and aeration have been carried to a high point.

My invention is based upon the use of a novel absorbing agent by which these disadvantages are overcome and the objects hereinabove stated may be attained.

I have found that certain thio-derivatives of metals whose sulphides are soluble in the presence of alkalies and including the metals of the so-called "tin group" of qualitative analysis, (embracing primarily arsenic, antimony and tin), or their acids,—are capable, in alkaline solutions, of absorbing hydrogen sulphide and of causing the liberation of absorbed sulphur in elemental form under the influence of an oxidizing agent, such as air.

Although the exact nature of the active material of my invention is uncertain, experiments which I have performed indicate that it is a thio-derivative of a compound of an acid of such a metal. For convenience, taking arsenic as a specific example, I designate my material as a thio-arsenic compound.

I do not, however, intend to limit myself to any precise compound but to include materials which may reasonably be supposed to include the elements of such a combination, and having the properties set forth herein. For example, whether or not arsenic were ultimately present in such material in the pentavalent form would be of little consequence, provided the character, method of preparation and the like, of the material were according to my specification and such as to justify its inclusion within the scope of my designation.

In order to set forth my invention clearly, I will now describe a specific instance of its preparation and use as an illustration thereof.

I have discovered that, when a solution of sodium arsenite is sulphided, as, for example, by passing gas laden with hydrogen sulphide through it, the original colorless solution acquires a greenish-yellow color. Upon aeration of the solution, the color practically disappears; no sulphur or hydrogen sulphide is liberated during aeration and this change is relatively slow. For convenience, as hereinabove stated, I designate the resultant material (in solution) as a sodium thio-arsenic compound. This solution is capable of absorbing further quantities of hydrogen sulphide, and, upon such sulphidation, acquires a color more truly yellow than the aforesaid greenish-yellow color of the original sulphided solution and that is distinguishable therefrom.

Upon further oxidation, as by aeration, the absorbed sulphur is quickly liberated and the substantially colorless solution of the sodium thio-arsenic compounds is regenerated, as is apparent when the free sulphur is removed from the liquid. This liquid may now be subjected to further and repeated sulphidation and aeration without returning to the original arsenite or its initial sulphided product. The latter may consequently be regarded as a partially sulphided arsenite, although capable of taking up no more hydrogen sulphide until subsequently aerated, and the said sodium thio-arsenic compound may be regarded as a stable material capable of employment in a cyclic process.

I have found that, in preparing my material, a ratio of at least three atoms of sodium to one atom of arsenic should be maintained in the original solution of sodium arsenite, but, after the formation of the thio-arsenic compound, it is not necessary to adhere to this ratio. However, I prefer to maintain the solution slightly alkaline and I may increase the alkalinity to neutralize acidic constituents which may be absorbed from the gas being treated. If there are less than three, for instance two, atoms of sodium to one of arsenic, the solution may be maintained slightly alkaline, or may inherently become neutral, and when sulphided may even become acid, especially after the arsenic passes out of the preliminary stage, i. e., is oxidized, so that in the latter case it may not be necessary to maintain even slight alkalinity of the solution even though alkali is added to compensate for losses.

I have found that solutions containing arsenic to the equivalent of only 0.1% of $As_2O_3$ are effective for gas purification, but ordinarily it is preferable to use a solution containing somewhat more arsenic. For example, I have secured good results with a solution containing the equivalent of 0.4% of $As_2O_3$. The alkalinity of such a solution calculated as $Na_2CO_3$ is approximately 0.3% assuming a ratio of three sodium atoms to one arsenic atom. I have also obtained good results with solutions containing higher percentages of arsenic, such as one containing the equivalent of approximately 0.8% of $As_2O_3$, but, in general, for ordinary gas purification purposes I prefer to use solutions containing the equivalent of about 0.5% of $As_2O_3$.

As the concentration of the solution rises, the amount of sulphur liberated per unit of solution is increased, resulting in heightened efficiency. I have found that a relatively low temperature retards the reaction, and, consequently, I prefer to maintain my absorbent liquid at a temperature above 20° C., and preferably at about 30° C., especially during the actification stage. The maintenance of such a temperature favors actification to a marked degree, and excellent actification has been obtained at still higher temperatures—for example, 50° C., although such higher temperatures are not usually economical.

I may variously accomplish the revivification of my absorbent solution after contact with the impurity-laden gas. Oxidizing agents, such as oxygen itself, or hydrogen peroxide, may be used, but I prefer to aerate the solution and in such manner as to cause a flotation and separation of the liberated sulphur. Foraminous aerators may be used for this purpose, but I prefer to use mechanical aerators or flotation machines, as these generally throw less spray into the air and have beeen found to be efficient. As the rate of actification of my solution is extremely rapid, oxygen present in the gas being purified may exert a considerable revivifying influence upon the fouled (i. e. sulphided) solution.

I have found that the rate of actification of the sulphided solution of sodium thio-arsenic compound is from two to three times as fast as the rate of actification of sulphided alkaline-iron suspensions. As the rate of actification exerts a limiting effect upon the capacity of said suspensions, it will be seen that my solution is of high capacity. Consequently, the size of the revivifying apparatus can be considerably reduced, as compared with prior practice.

While I have indicated the use of sodium as the alkaline element of my material, I may use other bases such as ammonium, potassium, magnesium and calcium with success. An advantage of my invention resides in the fact that the formation of thiosulphate with consequent consumption of the alkaline element is considerably less than in processes employing metallic compounds in alkaline suspension. Moreover, the other metal in combination,—for example, arsenic—is not substantially consumed in the cyclic process, nor in side reactions incident thereto. Only mechanical losses of this metal and of the alkali and a very small consumption of the alkali in side reactions need be accounted for in continued operation.

Ordinarily, no preliminary treatment will be required for preparing my solution or the consequent additions to make for the above losses, for the gas to be purified may be relied upon to accomplish the preliminary sulphidation, and, as the absorptive capacity of the original sodium arsenite solution with respect to hydrogen sulphide is very high, the process will ordinarily operate satisfactorily from the beginning and continuing after the stable thio-arsenic compound is formed. However, the solution of sodium arsenite may be subjected to preliminary sulphidation and oxidation, if desired. It should be noted that this initial oxidation is not a revivification but a conversion of the solution of hydrogen sulphide in alkaline-arsenite into the more stable material which I have designated as a theio-arsenic compound.

In the treatment of gases containing hydrogen cyanide as well as hydrogen sulphide, I have found that all of the hydrogen cyanide is removed from the gas and converted into a thiocyanate,—e. g. NaSCN—probably through interaction between free sulphur and the sodium cyanide (NaCN) that is undoubtedly first formed.

My invention provides an economical and effective gas purification process, operating with low consumption of alkali and with high efficiency of actification, and being capable of fixing sulphur absorbed from gas in elemental form.

While I have hereinabove described my invention with particular reference to certain illustrative examples, it is not limited to such instances, but is to be construed within the scope of the following claims.

I claim as my invention:

1. The process of purifying gas by removing therefrom impurities comprising sulphur compounds which comprises subjecting the gas to contact with a thio-arsenic compound.

2. The process of purifying gas by removing therefrom impurities comprising sulphur compounds which comprises washing the gas with a solution of a thio-arsenic compound of an alkali forming metal.

3. The process of purifying gas by removing therefrom impurities comprising sulphur compounds which comprises washing the gas with a partially sulphided alkaline solution of a compound of a metal whose sulphides are soluble in the presence of alkalies.

4. The process of purifying gas by removing therefrom impurities comprising sulphur compounds which comprises washing the gas with a previously sulphided and oxidized alkaline solution of a compound of a metal of the tin group.

5. The process of purifying gas by removing therefrom impurities comprising sulphur compounds which comprises washing the gas with a partially sulphided alkaline solution of a compound of arsenic.

6. The process of purifying gas by removing therefrom impurities comprising sulphur compounds which comprises washing the gas with a partially sulphided solution of an alkali forming metal salt of an acid of a metal of the tin group.

7. The process of purifying gas by removing therefrom impurities comprising sulphur compounds which comprises washing the gas with a partially sulphided solution of sodium arsenite.

8. The process of removing hydrogen sulphide from gas which comprises washing the gas with a solution of a sodium thio-arsenic compound.

9. The process of purifying gas by removing therefrom impurities comprising sulphur compounds which comprises washing the gas with a previously sulphided and oxidized alkaline solution containing the equivalent of up to 2% of $As_2O_3$.

10. The process of purifying gas by removing therefrom impurities comprising sulphur compounds which comprises washing the gas with a previously sulphided and oxidized alkaline solution containing the equivalent of about 0.5% $As_2O_3$.

11. The process of purifying gas by removing therefrom impurities comprising sulphur compounds which comprises washing the gas with a partially sulphided solution of a compound of a metal of the tin group of up to 3% alkalinity calculated as $Na_2CO_3$.

12. The process of purifying gas by removing therefrom impurities comprising sulphur compounds which comprises washing the gas with a partially sulphided solution of a compound of a metal of the tin group of approximately .75% alkalinity, calculated as $Na_2CO_3$.

13. The process of purifying gas by removing therefrom impurities comprising sulphur compounds which comprises washing the gas with a solution of an alkaline thio-derivative of a metal.

14. The process of purifying gas by removing therefrom impurities comprising sulphur compounds which comprises washing the gas with a warm solution of an alkaline thio-derivative of a metal.

15. The process of purifying gas by removing therefrom impurities comprising sulphur compounds which comprises washing the gas with a solution of an alkaline thio-derivative of a metal maintained at a temperature of from 20° C. to 50° C.

16. The process of purifying gas by removing therefrom impurities comprising sulphur compounds which comprises washing the gas with a solution of an alkaline thio-derivative of a metal maintained at a temperature of approximately 30° C.

17. A cyclic process of purifying gas by removing therefrom impurities comprising sulphur compounds which comprises circulating a solution of an alkali forming metal thio-arsenic compound over the flowing gas, removing the solution after contact with the gas, regenerating the solution and recirculating it over the gas.

18. The process of regenerating a solution of an alkali forming metal thio-arsenic compound which has been used to remove impurities comprising sulphur compounds from gas which comprises subjecting said solution to the action of an oxidizing agent.

19. The process of regenerating a solution of an alkali forming metal thio-arsenic compound which has been used to remove impurities comprising sulphur compounds from gas which comprises aerating the said solution to liberate free sulphur.

20. The process of purifying gas by removing therefrom impurities comprising sulphur compounds which comprises washing the gas with a previously sulphided oxidized solution of sodium arsenite containing sodium and arsenic in the ratio of at least more than one atom of sodium to one atom of arsenic respectively.

21. The process of preparing a gas purification solution which comprises sulphiding a solution of sodium arsenite and then oxidizing the sulphided solution.

22. The process of preparing a gas purification solution which comprises sulphiding a solution of sodium arsenite and subjecting the sulphided solution to the action of a gas containing oxygen.

23. The process of preparing a gas purification solution which comprises sulphiding a solution of sodium arsenite and then aerating the sulphided solution.

24. The process of preparing a gas purification solution which comprises sulphiding a solution of sodium arsenite and aerating the sulphided solution until it is substantially colorless.

25. The process of preparing a gas purification solution which comprises sulphiding a solution of sodium-arsenite containing sodium and arsenic in the ratio of at least more than one atom of sodium to one atom of arsenic, and subjecting the sulphided solution to oxidation.

26. The process of regenerating a solution containing an alkali-forming metal and arsenic that has been used to remove impurities from gas which comprises subjecting the solution to mechanical aeration.

27. The process of gas purification which comprises recirculating over the gas to be purified and through an actification stage, a solution of sodium arsenite that has previously been passed over gas containing hydrogen sulphide, and aerated.

28. The cyclic process of gas purification which comprises recirculating a solution containing an alkali-forming metal, arsenic, and sulphur over the flowing gas for removal of impurities comprising sulphur compounds and through an actification stage where it is regenerated for further use.

29. The cyclic process of gas purification which comprises recirculating a partially sulphided solution of an alkali forming metal compound of arsenic over the flowing gas for removal of impurities comprising sulphur compounds and through an actification stage where it is regenerated for further use.

30. The process of purifying gas by removing therefrom impurities comprising sulphur compounds which comprises subjecting the gas to the action of a purifying agent comprising a thio-arsenic compound for the removal of said impurities, effecting a regeneration of said purifying agent and using it for further purification of gas.

In testimony whereof, I have hereunto subscribed my name this first day of November, 1926.

HERBERT A. GOLLMAR.